M. MUSSINO.
PROCESS OF TREATING MILK.
APPLICATION FILED MAY 31, 1917.

1,284,751.

Patented Nov. 12, 1918.

INVENTOR
Michel Mussino.
BY
Rosenbaum, Stockbridge & Boret
ATTORNEYS

UNITED STATES PATENT OFFICE.

MICHEL MUSSINO, OF NICE, FRANCE, ASSIGNOR TO FRANK D. REILLY, OF MONTCLAIR, NEW JERSEY.

PROCESS OF TREATING MILK.

1,284,751.  Specification of Letters Patent.  Patented Nov. 12, 1918.

Application filed May 31, 1917. Serial No. 171,930.

*To all whom it may concern:*

Be it known that I, MICHEL MUSSINO, a subject of Italy, residing at Nice, France, have invented certain new and useful Improvements in Processes of Treating Milk, of which the following is a full, clear, and exact description.

This invention relates to a process of treating milk while it is at a temperature above that at which a skin forms upon its exposed surface.

As is well known, milk is frequently boiled or raised to a temperature somewhat below its boiling point for the purpose of destroying the bacteria and also for cooking purposes. Invariably after the milk is heated to this high temperature, a skin forms upon its exposed surface, which is objectionable and is usually removed from the surface of the milk before use. This skin contains an appreciable quantity of the nutritive content of the milk, so that the milk remaining after the skin is removed is in markedly impoverished condition.

This invention has for its object a process whereby milk may be heated or retained hot without the formation of this skin.

It is also well known that milk which is placed in a receptacle and is not completely filled and sealed, is frequently infected with the bacteria which are present in the air. It is also the object of the invention to provide against the infection of the milk in this manner.

The formation of the skin upon the exposed surface of milk which is brought to the boiling point or to a temperature approximating the boiling point, has been attributed to various organic changes occurring in milk when heated. According to some authorities the formation of the skin is the result of the desiccation of a portion of the proteid content of the milk, due to surface evaporation. In some instances it has been attributed to the coagulation of the casein and albumen when exposed to contact with the air. According to the present invention, the upper surface of the milk in a receptacle in which it is heated or in which it is kept hot, is completely covered, in such a manner as to prevent surface evaporation and to exclude the surrounding air. One embodiment of an apparatus in which the process may be carried out, is shown in the accompanying drawings in connection with which the process will be described in detail, and in which—

Figure 1:
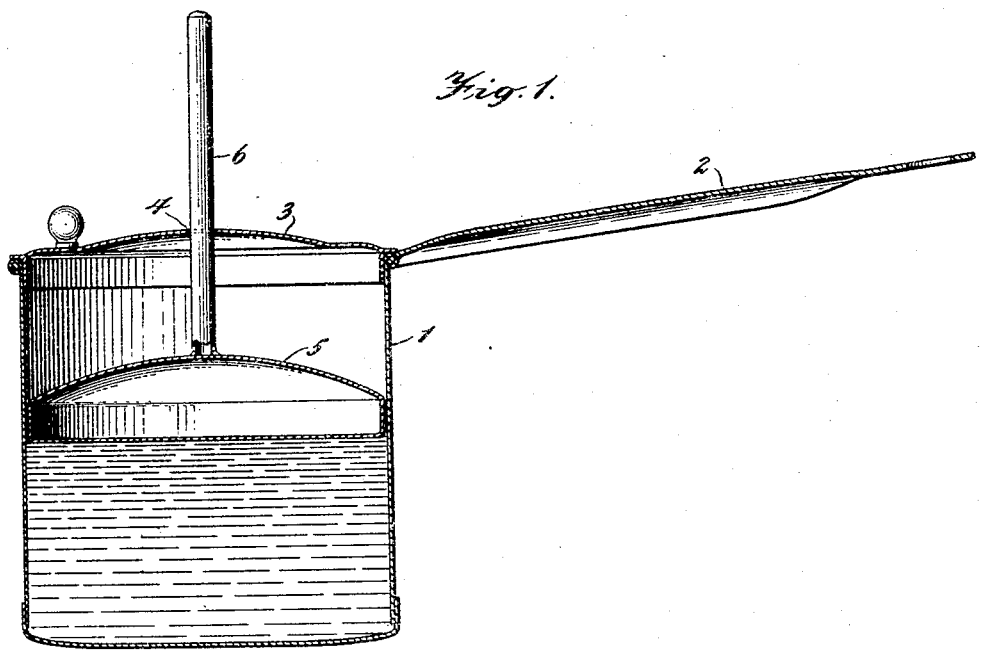
Figure 1 shows a vertical section through the apparatus.
Figure 2:
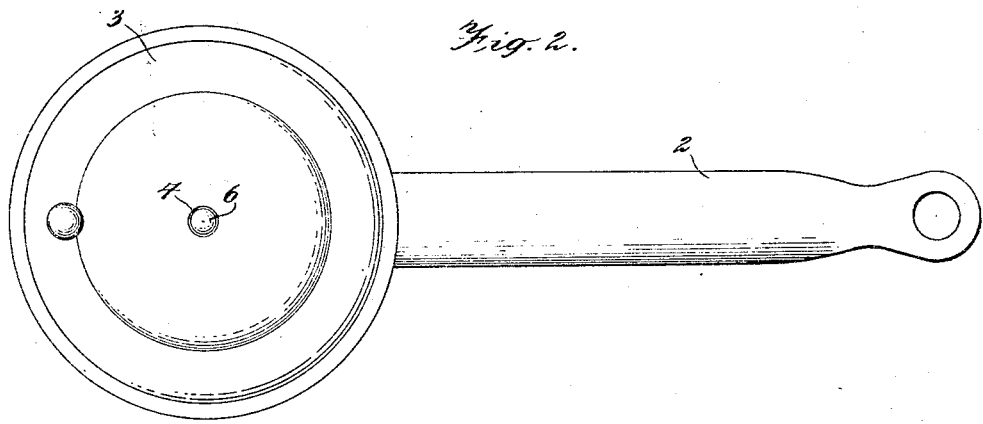
Fig. 2 is a top plan view thereof.

The apparatus comprises a receptacle 1 which may be of any desirable shape, but is preferably cylindrical and may be provided with a handle 2. This part of the apparatus is in no wise different from the usual pan or boiler, which is utilized at the present time for heating or boiling milk.

The receptacle 1 may be provided with the usual cover 3, which, in the present construction, is provided with a centrally-disposed opening 4. The novel portion of the boiler comprises a float 5 which may be of a hollow metal construction, or of any other suitable material whose specific gravity is less than that of milk, whereby it will float upon the surface of the milk contained within the receptacle. This float is of slightly less diameter than the diameter of the receptacle so that practically none of the surface of the milk within the receptacle is exposed when the float is in place thereon. The float may be provided with a stem 6, which passes through the central opening 4 within the cover 3 which serves to prevent the float from tipping. The cover 3, however, is not essential to the apparatus.

The manner in which this boiler is used is as follows: The cold milk is poured into the receptacle 1 and the float 5 is placed upon the same, whereby the entire upper surface of the milk is completely covered by the float which is in contact therewith. The boiler is then placed over a suitable heating medium, and the milk heated until it reaches its boiling point, which will be indicated by a rise of the float within the receptacle. The boiler is then removed from the fire and when the milk cools to a temperature below the temperature at which the skin forms upon its exposed surface, it may be poured from the receptacle and used as desired. To pour a portion of the milk from the receptacle, it is not necessary to remove the float, for if the top cover 3 is removed, the milk may be poured from the receptacle by tilting the same, the float resting upon the surface of the liquid.

Before pouring the milk from the receptacle, it is preferable to push the float down into the milk and twirl it gently for a few turns. The reason for this is that even where the float is used, it has been found that when milk is heated, the cream gradually rises toward the surface of the milk without coagulating and adheres to the bottom of the float. When a slight twirling movement is given to the float, the cream adhering to the bottom of the float is removed and is again incorporated into the milk.

The skin will form upon hot milk which is not quite to a boiling temperature, as well as upon milk while at or above the boiling temperature, and for this reason care should be exercised to keep the float upon the milk until the milk cools down to a temperature below the point at which the skin forms.

It has been found that when milk is heated, or is retained hot in this manner, the objectionable skin, which has heretofore invariably formed upon the milk, is entirely eliminated.

Another advantage of the apparatus and process described, is that the float prevents the air from coming into contact with the exposed surface of the milk. If the usual milk receptacle is partially emptied, the exposed surface of the milk absorbs the bacteria from the air which will then breed within milk. With the present construction, however, if a portion of the milk is utilized, the float still remains in contact with the exposed surface of the remainder of the milk within the receptacle, and will thus prevent contact between the exposed surface and the air until the entire quantity of milk has been used.

The process described may be carried out with other types of apparatus than the one described, the scope of the invention being apparent from the appended claims.

I claim:

1. The process of treating milk, which consists in heating the milk in an open vessel to a temperature above that at which a skin normally forms thereon, and continuously maintaining a rigid seal in contact with the upper surface of the milk.

2. The process of treating milk in an open vessel, which consists in boiling the milk, and maintaining a floating seal on the upper surface of the milk while the latter is being heated to the boiling point.

3. The process of treating milk in an open vessel, which consists in boiling the milk, and continuously maintaining a floating rigid seal in contact with the upper surface of the milk.

In witness whereof, I subscribe my signature in the presence of two witnesses.

MICHEL MUSSINO.

Witnesses:
R. ROBINSON RILEY,
S. HENDERSON.

Copies of this patent may be obtained for five cents each, by addressing the "Commissioner of Patents, Washington, D. C."